United States Patent
Kawai et al.

[11] Patent Number: 6,048,509
[45] Date of Patent: Apr. 11, 2000

[54] GAS PURIFYING PROCESS AND GAS PURIFYING APPARATUS

[75] Inventors: Masato Kawai; Morimitsu Nakamura; Nobuhiro Okamura, all of Tokyo, Japan

[73] Assignee: Nippon Sanso Corporation, Tokyo, Japan

[21] Appl. No.: 09/084,165

[22] Filed: May 26, 1998

[30] Foreign Application Priority Data

May 23, 1997 [JP] Japan .................................... 9-133883

[51] Int. Cl.⁷ .................................................. B01D 53/04
[52] U.S. Cl. ........................... 423/230; 423/247; 423/248; 423/437.2; 423/580.1; 95/96; 95/97; 95/98; 95/117; 95/139
[58] Field of Search ................................ 95/139, 117, 98, 95/97, 96; 423/230, 247, 437.2, 580.1, 248

[56] References Cited

U.S. PATENT DOCUMENTS

| | | | |
|---|---|---|---|
| 5,110,569 | 5/1992 | Jain | 423/230 |
| 5,202,096 | 4/1993 | Jain | 422/190 |

FOREIGN PATENT DOCUMENTS

| | | | |
|---|---|---|---|
| 2-307506 | 12/1990 | Japan | 423/247 |
| 4-219111 | 8/1992 | Japan . | |
| 5-65782 B2 | 9/1993 | Japan . | |
| 2188620 | 10/1987 | United Kingdom | 95/117 |

*Primary Examiner*—Steven P. Griffin
*Assistant Examiner*—Timothy C Vanoy
*Attorney, Agent, or Firm*—Armstrong, Westerman, Hattori, McLeland & Naughton

[57] ABSTRACT

A method is provided for removing water, carbon monoxide and carbon dioxide out of a gas, such as air, by passing the gas through a packed column so that the gas sequentially contacts a catalyst consisting of platinum or palladium and at least one member selected from the group consisting of iron, cobalt, nickel, manganese, copper, chromium, tin, lead and cerium wherein the catalyst is supported on alumina containing substantially no pores having pore diameters of 110 Angstroms or less under conditions which oxidize the carbon monoxide in the gas into carbon dioxide; an adsorbent selected from the group consisting of silica gel, activated alumina, zeolite and combinations thereof under conditions in which water is adsorbed and removed from the gas and an adsorbent selected from the group consisting of calcium ion exchanged A zeolite; calcium ion exchanged X zeolite; sodium ion exchanged X zeolite and mixtures thereof under conditions which carbon dioxide is adsorbed and removed from the gas. The gas may also be subjected to a catalyst/adsorbent in the packed column to effect oxidation and removal of hydrogen in the gas.

6 Claims, 4 Drawing Sheets

GAS PURIFYING PROCESS AND GAS PURIFYING APPARATUS

BACKGROUND OF THE INVENTION AND RELATED ART STATEMENT

The present invention relates to a process and an apparatus for purifying a gas, particularly to a process and an apparatus for purifying a gas containing as major components oxygen and nitrogen and as impurities to be removed at least water, carbon dioxide and carbon monoxide. More specifically, the present invention relates to a process and an apparatus for purifying raw air so as to supply the treated air as clean dry air. The present invention also relates to a process and an apparatus for purifying a gas which are suitably realized in a pre-treating equipment for purifying a raw air to be supplied to a cryogenic separation unit by carrying out oxidation of trace hydrogen and trace carbon monoxide contained in the raw air to form water and carbon dioxide and remove them using adsorbents, respectively.

Recently, there is an increasing demand for high-purity gases, and particularly nitrogen gas, which is consumed in large amounts in electronics industries especially in the semiconductor manufacturing process, is required to be of highest possible purity. Nitrogen gas utilized in the field of electronics should be treated to remove chemically active impurities such as oxygen, water, carbon dioxide, hydrogen, carbon monoxide and hydrocarbons contained therein so as to be as pure as possible.

When nitrogen gas is to be separated from air, the cryogenic separation process is suitably employed in view of the scale of production and gas purity. However, all of such impurities as described above cannot be separated from nitrogen by distillation according to the cryogenic separation process, but water and carbon dioxide are in many cases removed by means of adsorption in the raw air supply system. It is possible to remove hydrogen by means of distillation, but hydrogen is contained in a very small amount in air, so that the distillation treatment involves not a small loss of nitrogen, and an extra distillation column must be installed because of vapor-liquid equilibrium relation of these gases. Further, carbon monoxide and nitrogen have approximately the same boiling points, so that it is difficult to separate carbon monoxide from nitrogen by means of distillation.

In view of such technical difficulties, there have been proposed some methods for removing hydrogen and carbon monoxide from raw air. Japanese Patent Publication No. Hei 5-65782 discloses a method in which hydrogen and carbon monoxide contained in raw air are reacted with oxygen also contained therein under the heating condition with the maximum temperature of 190° C. to be converted into water and carbon dioxide respectively which are then removed using a so-called pre-treating equipment usually installed in cryogenic separation units. In this method, in order to provide an optimum temperature for carrying out the oxidation reactions of hydrogen and carbon monoxide, raw air heated to 80 to 150° C. by compression is further heated through a heat exchanger and a heater and then introduced to a catalyst column to effect oxidation of hydrogen and carbon monoxide. While this method is successful in improving efficiency of the apparatus by utilization of the heat of compression, heat recovery by heat exchangers, etc., it inevitably leads to increase in the power consumed for heating, variable expense and fixed expense for apparatuses or heat exchanger, etc.

Meanwhile, Japanese Unexamined Patent Publication No. Hei 4-219111 discloses a method in which adsorption units employed as pre-treating equipments for the cryogenic separation unit, which removes water and carbon dioxide, are allowed to have a three-layer structure consisting of a desiccant, a catalyst and a $CO_2$ adsorbent, and water, carbon dioxide, hydrogen and carbon monoxide contained in raw air are designed to be removed simultaneously. According to this method, hydrogen and carbon monoxide are also oxidized to be converted into water and carbon dioxide which are then removed using the adsorbent. This method enjoys merits in that it employs raw air having a temperature of 5 to 50° C. to require no heating procedure and that it requires no extra catalyst column for carrying out oxidation of hydrogen and carbon monoxide, since the catalyst is packed into existing pre-treating adsorption units. However, to pack a catalyst between a desiccant and a $CO_2$ adsorbent in each adsorption unit affects significantly regeneration of the adsorbent. More specifically, when thermal swing adsorption (TSA) process is employed, the catalyst is packed on the upstream side (with respect to the regenerated gas introducing path) of the desiccant which requires the greatest heat in this process, so that increase in the heat necessary for heating and in the amount of gas to be used for the regeneration cannot be avoided. Meanwhile, when pressure swing adsorption (PSA) is employed, there is no problem in the heating value to be consumed for regeneration, but it causes increase in the amount of purge gas due to increase in the capacity of the adsorption units or loss of raw air to be caused by the operation of switching between adsorption units.

OBJECTS AND SUMMARY OF THE INVENTION

It is an objective of the present invention to provide a process and an apparatus for purifying a gas, which can prevent increase in the power consumed for heating, variable expense and fixed expense for heat exchangers and the like, the amount of purge gas, loss of raw air, etc. from occurring and which can also remove efficiently hydrogen and carbon monoxide.

The process for purifying a gas according to the present invention purifies a raw gas containing as impurities to be removed at least water, carbon dioxide and carbon monoxide and as major components oxygen and nitrogen, which comprises the procedures of oxidizing carbon monoxide to form carbon dioxide, adsorbing and removing water, and adsorbing and removing carbon dioxide, wherein these procedures are carried out in this order. The raw gas is typically air.

Meanwhile, when the impurities to be removed includes hydrogen, it is oxidized using a catalyst to form water which is adsorbed and removed by any one of a carrier of the catalyst, a water adsorbent packed together with the catalyst and a water adsorbent packed at a position on the downstream side of the catalyst. The oxidation of hydrogen and the adsorption and removal of the water formed are preferably carried out subsequent to the adsorption and removal of carbon dioxide.

Further, when raw air, containing as impurities to be removed at least water, carbon dioxide and carbon monoxide and as major components oxygen and nitrogen, to be introduced to an air separation system is purified employing at least two packed columns each containing a catalyst layer, a water adsorbent layer, a carbon dioxide adsorbent layer and a hydrogen removing layer packed to be layered in this order from an inlet side of the column, a purification process is carried out in one of the packed columns by introducing to the column through an inlet thereof compressed raw air to effect successively conversion of carbon monoxide into carbon dioxide in the catalyst layer, removal of water in the water adsorbent layer, removal of carbon dioxide in the carbon dioxide adsorbent layer, and oxidation of hydrogen into water and removal of the resulting water in the hydrogen removing layer, and by introducing the thus purified air led out an outlet of the column to a cryogenic separation system; and a regeneration process is carried out in the other packed column by introducing to the column through an outlet thereof a part of a return gas from the cryogenic separation system after heating of the gas to effect desorption of water adsorbed by the hydrogen removing layer, carbon dioxide adsorbed by the carbon dioxide adsorbent layer and water adsorbed by the water adsorbent layer to discharge the resulting gas through an inlet of the column, by introducing to the column through the outlet thereof a part of the return gas which is not heated to cool each layer, and by introducing a part of the purified air into the column to repressurize the column; wherein the purification process and the regeneration process are repeated alternately in these two packed columns to carry out purification of the raw air successively and continuously.

Further, when raw air, containing as impurities to be removed at least water, carbon dioxide, carbon monoxide and hydrogen and as major components oxygen and nitrogen, is purified so as to obtain a clean dry air employing at least two packed columns each containing a catalyst layer, a water adsorbent layer, a carbon dioxide adsorbent layer and a hydrogen removing layer packed to be layered in this order from an inlet side of the column, a purification process is carried out in one of the packed columns by introducing to the column through an inlet thereof compressed raw air to effect successively conversion of carbon monoxide into carbon dioxide in the catalyst layer, removal of water in the water adsorbent layer, removal of carbon dioxide in the carbon dioxide adsorbent layer, and oxidation of hydrogen into water and removal of the resulting water in the hydrogen removing layer, and by introducing the thus purified air led out an outlet of the column to a user; and carrying out a regeneration process in the other packed column by introducing to the column through an outlet thereof a part of the purified air from the former packed column after heating of the air to effect desorption of water adsorbed by the hydrogen removing layer, carbon dioxide adsorbed by the carbon dioxide adsorbent layer and water adsorbed by the water adsorbent layer to discharge the resulting gas through an inlet of the column, by introducing to the column through the outlet thereof a part of the return gas which is not heated beforehand to cool each layer, and by introducing a part of the purified air into the column to repressurize the column; and the purification process and the regeneration process being repeated alternately in these two packed columns to carry out purification of the raw air successively and continuously.

An apparatus for purifying a gas according to the present invention contains, so as to purify a raw gas containing as impurities to be removed at least water, carbon dioxide and carbon monoxide and as major components oxygen and nitrogen, a catalyst for oxidizing carbon monoxide, a water adsorbent and a carbon dioxide adsorbent are packed in this order from a raw gas inlet side. Further, the catalyst for oxidizing carbon monoxide consists of platinum or palladium and at least one of iron, cobalt, nickel, manganese, copper, chromium, tin, lead and cerium, which are carried on an alumina carrier containing substantially no pores having pore diameters of 110 Å or less.

According to the process and apparatus for purifying a gas of the present invention, carbon monoxide and hydrogen are oxidized at normal temperature, and they can be removed together with water and carbon dioxide which are originally contained in the raw gas. Further, the regeneration procedures can be carried out efficiently, so that the amount of regenerating gas and consumption of heating energy can be reduced. The apparatus for purifying a gas is suitable as a pre-treating equipment for an air separation plant.

DETAILED DESCRIPTION OF PREFERRED EMBODIMENTS

Figure 1:
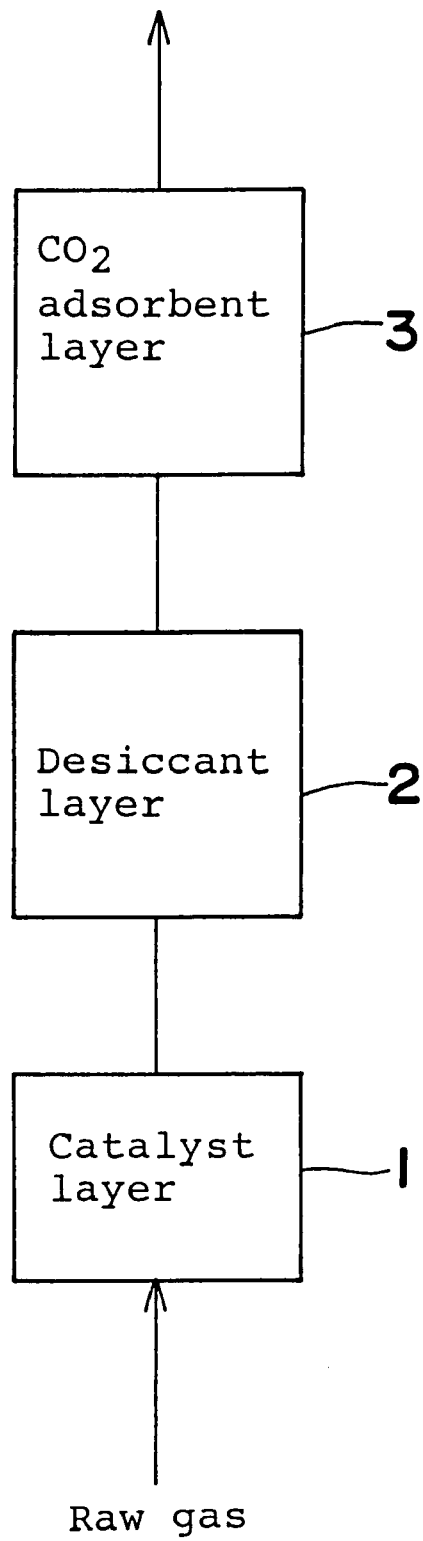
FIG. 1 is a system diagram showing a gas purifying apparatus according to one embodiment of the invention.

FIG. 1 is a system diagram showing a gas purifying apparatus according to one embodiment of the present invention, in which a catalyst layer 1 formed by packing a catalyst for oxidizing carbon monoxide into carbon dioxide, a desiccant layer 2 formed by packing a water adsorbent for removing water by adsorption and a $CO_2$ adsorbent layer 3 formed by packing a carbon dioxide adsorbent for removing carbon dioxide by adsorption are arranged downstream in this order with respect to the flow of a gas to be treated (raw gas).

The catalyst to be packed to form the catalyst layer 1 may not be particularly limited so long as it can oxidize carbon monoxide into carbon dioxide, and there is employed preferably at least one metal selected from the group consisting of iron, cobalt, nickel, manganese, copper, chromium, tin, lead and cerium, in addition to platinum or palladium, which are carried on an alumina carrier containing substantially no pores having pore diameters of 110 Å or less. A raw gas containing moisture is as such introduced into the catalyst layer 1 where it is subjected to a procedure of oxidizing carbon monoxide contained in the gas to form carbon dioxide.

As the water adsorbent to be packed to form the desiccant layer 2, there may employed silica gel, activated alumina and zeolite singly or in combination. The raw gas is subjected to a procedure of removing moisture contained therein by adsorption when it passes through this desiccant layer 2 to become an extremely dry state.

As $CO_2$ adsorbent to be packed to form the $CO_2$ adsorbent layer, various kinds of zeolites are preferably employed, and typically Ca-A type, Na-X type, Ca-X type or A type/X type having been subjected to ion exchange reaction with a single metal ion or a plurality of metal ions may be employed singly or as a mixture of two or more of them. The raw gas is subjected to a procedure of removing carbon dioxide contained therein by adsorption when it is passed through this $CO_2$ adsorbent layer 3 to become a high-purity state.

When the raw gas contains hydrogen as another impurity to be removed, hydrogen is also oxidized by a catalyst to be converted into water, and a fourth treatment layer, i.e. a hydrogen removing layer, for adsorbing and removing the water formed by the oxidation is incorporated. As the catalyst for achieving oxidation of hydrogen employed in this hydrogen removing layer, palladium or platinum is most preferred, and palladium and/or platinum carried in an amount of 0.25 to 1.0% by weight on an activated alumina or zeolite carrier is suitably employed. As the adsorbent (desiccant) for adsorbing and removing the water formed, there may be employed silica gel, activated alumina and zeolite like in the case of the desiccant layer 2. These desiccants may be packed in the form of mixture with the catalysts or may be packed to form a layer on the downstream side of the catalyst layer 1. If the hydrogen oxidizing catalyst described above is carried on an activated alumina or zeolite as described above, the carrier itself carrying thereon the catalyst can adsorb and remove the moisture formed thereon.

The procedure of removing hydrogen contained in the raw gas in the fourth treatment layer (hydrogen removing layer) may be incorporated into the line at any site on the downstream side of the desiccant layer 2. However, in order to achieve a high-degree of removal of the water formed by oxidation of hydrogen, it is preferred to employ zeolite as the carrier of the hydrogen oxidizing catalyst. In this case, the hydrogen removing layer 4 is desirably located on the downstream side of the $CO_2$ adsorbent layer 3, i.e. this hydrogen removing treatment is carried out as a final procedure after completion of the other procedures described above, so as to avoid the influence of carbon dioxide.

By arranging the catalyst layer 1, the desiccant layer 2, the $CO_2$ adsorbent layer 3 and, as necessary, the hydrogen removing layer 4 in this order downstream with respect to the flow of the raw gas to be introduced as described above, oxidation of carbon monoxide and hydrogen with the catalyst and removal of the water and carbon dioxide formed by the oxidation reactions and of water and carbon dioxide carried originally in the raw gas are combined into a series of procedures to enable efficient purification of the gas.

Figure 2:
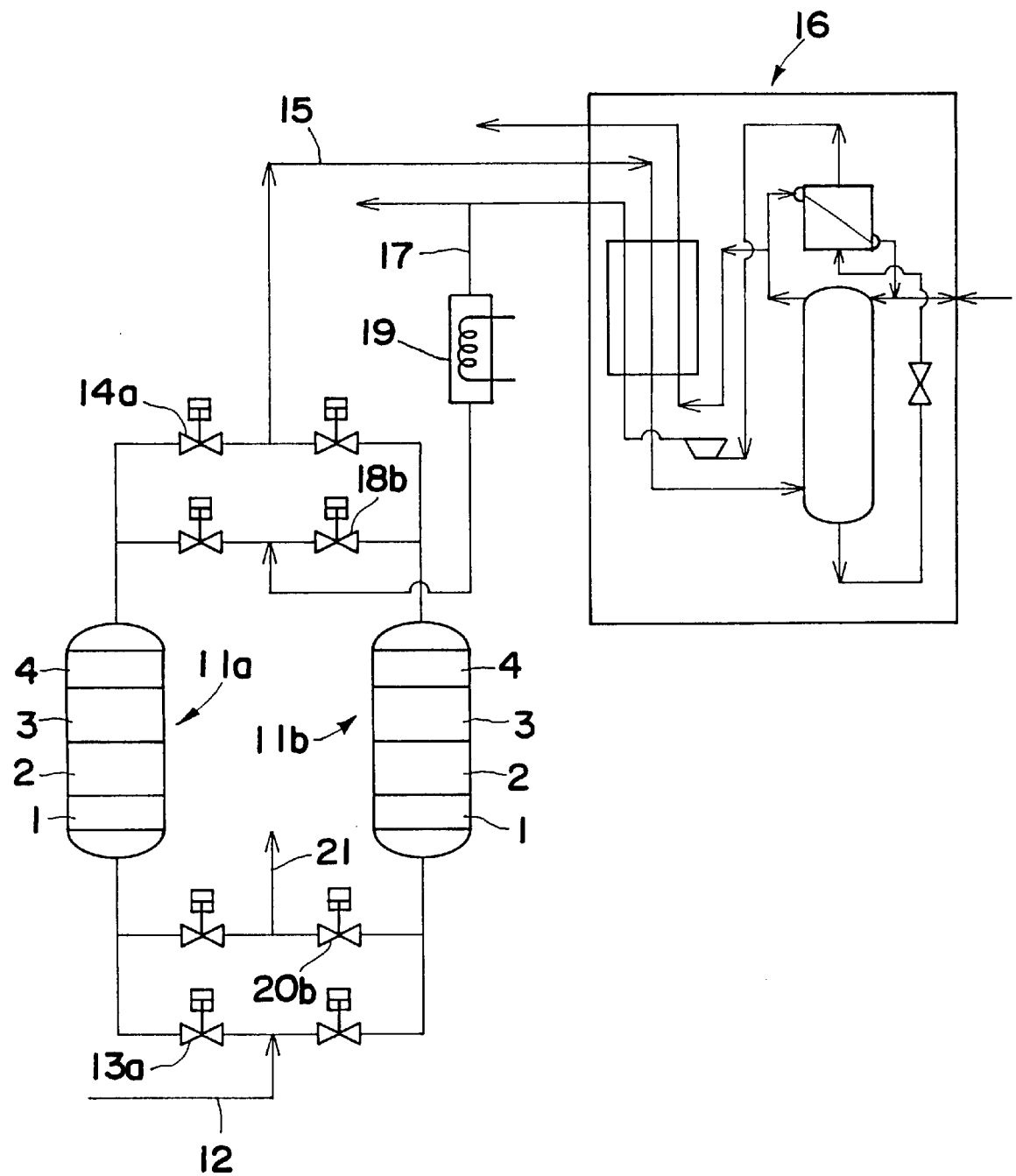
FIG. 2 is a system diagram showing an example of the apparatus of the invention employed as a pre-treating equipment for an air separation plant.

FIG. 2 is a system diagram showing an example of the apparatus of the invention employed as a pre-treating equipment for an air separation plant, which is provided with two packed columns 11a and 11b each containing a catalyst layer 1, a desiccant layer 2, a $CO_2$ adsorbent layer 3 and a hydrogen removing layer 4 in this order from the raw air inlet side so that the apparatus can carry out purification of raw air successively and continuously.

In FIG. 2, when the packed column 11a and the packed column 11b are carrying out a purification process and a regeneration process respectively, a gas (raw air) compressed by a compressor and passed through an after-cooler and a water separator to flow through a line 12 into the packed column 11a via a raw gas inlet valve 13a. The raw air introduced into the packed column 11a has a temperature of, for example, 5 to 50° C.

The raw air introduced into the packed column 11a first goes through the catalyst layer 1 where carbon monoxide contained in the raw air is reacted with oxygen also contained therein under the action of the catalyst to be oxidized into carbon dioxide. Next, in the desiccant layer 2, the moisture contained in the raw air is adsorbed and removed, and then carbon dioxide contained originally in the raw air and the carbon dioxide formed in the catalyst layer 1 are adsorbed and removed in the $CO_2$ adsorbent layer 3. Finally, in the hydrogen removing layer 4, hydrogen contained in the raw air is reacted with oxygen contained in the raw air under the action of the catalyst to be oxidized into water which is also adsorbed and removed by the carrier of the catalyst and the like.

The raw air purified in the packed column 11a flows out of an outlet of the column 11a to flow further through a purified gas outlet valve 14a and a line 15 into a cryogenic separation system 16. The portion of the gas which was not converted into a product in the cryogenic separation system 16 is then introduced as a regenerating gas through a line 17 and a valve 18b into the packed column 11b. In the packed column 11b, the hydrogen removing layer 4 adsorbed water formed by oxidation reaction of hydrogen in the previous purification process, while the $CO_2$ adsorbent layer 3 has carbon dioxide adsorbed thereon, and these layers 4 and 3 are immediately before the breakthrough points. Meanwhile, the desiccant layer 2 has water adsorbed thereon and is also immediately before the breakthrough point. The catalyst layer 1 is performing only catalyzing function for oxidizing carbon monoxide and underwent no particular change in its state.

When regeneration process is started in such states, the regenerating gas is heated in a heater 19 to a necessary temperature (e.g., 150 to 250° C.) and then introduced into the packed column 11b where the heat of the gas is transferred to the respective layers to effect desorption of water and carbon dioxide therefrom. The gas carrying the water and carbon dioxide thus desorbed flows through a valve 20b and a line 21 to be released into the atmosphere. When the respective layers are heated to necessary temperatures and desorption of water and carbon dioxide are fully carried out, heating is stopped and the regenerating gas is fed successively to cool the heated treating layers. Further, in the latter half of the regeneration process, a procedure of repressurizing the column 11b is carried out employing a part of the purified gas to complete preparation for starting the next cycle of purification process.

The purification process in the packed column 11a is continued so long as the concentration of water and that of carbon dioxide in the air purified in the column 11a are reduced to be within allowable ranges and is terminated before breakthrough occurs to be switched to the regeneration process, and also the operation of the packed column 11b is switched to the purification process. The purification process and the regeneration process employing the packed columns 11a and 11b are switched to each other at predetermined intervals to allow the packed columns 11a and 11b to repeat purification and regeneration alternately, and thus raw air is purified successively and continuously.

Figure 3:
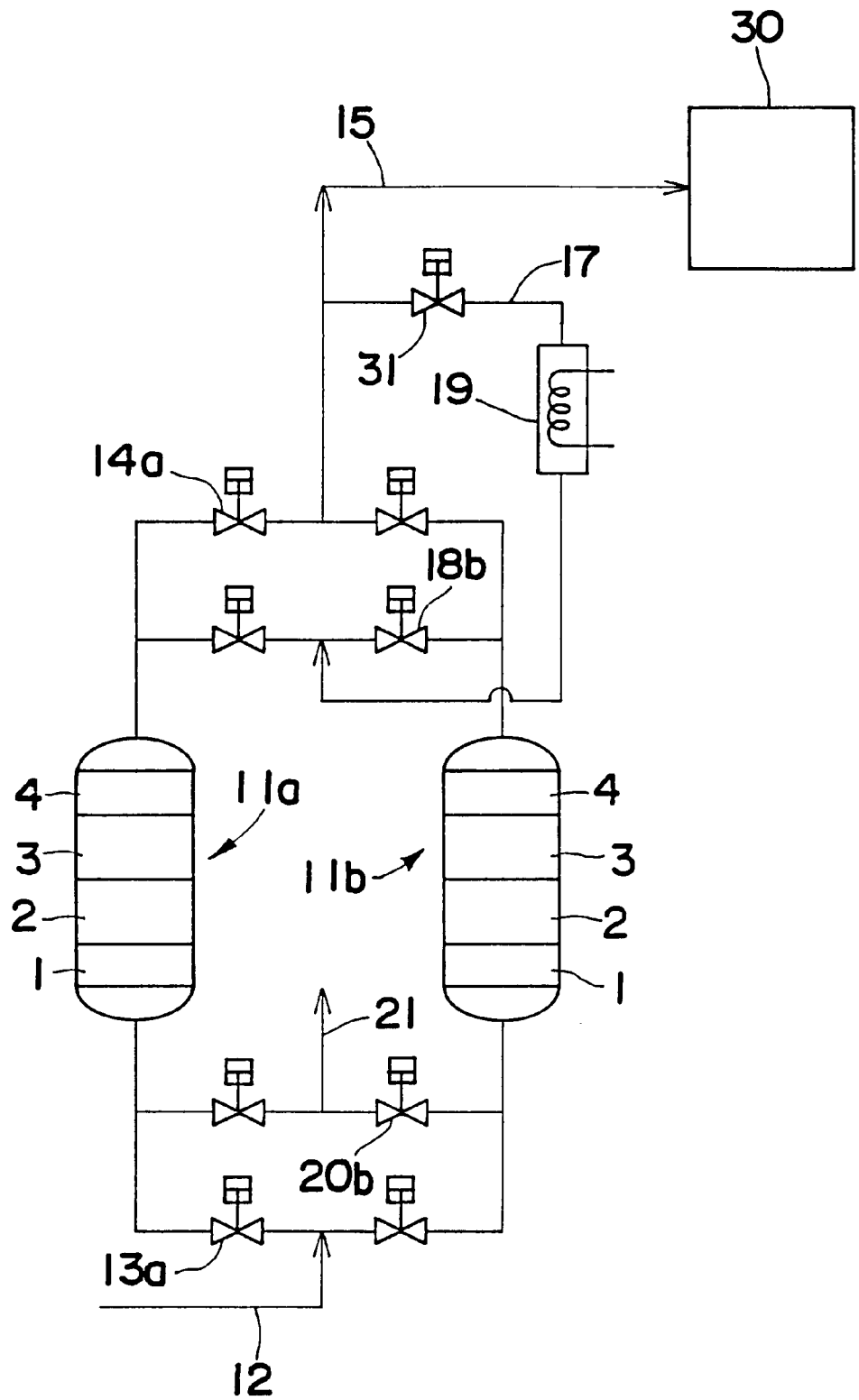
FIG. 3 is a system diagram showing a gas purifying apparatus of the invention employed as an equipment for producing clean dry air.

FIG. 3 is a system diagram showing a gas purifying apparatus of the invention employed as an equipment for producing clean dry air. In FIG. 3, the same and like constituents as in FIG. 2 are affixed with the same reference numbers respectively, and detailed description of them are omitted.

This apparatus supplies clean dry air drawn into the line 15 to a user 30 instead of the cryogenic separation system 16 shown in FIG. 2 and also utilizes a part of the clean dry air diverted into a line 17 as a regeneration gas. The line 17 is provided with a flow control valve 31. In this embodiment, regeneration of the packed columns is carried out employing a part of the clean dry air.

As shown in FIGS. 2 and 3, since the catalyst layer 1 for oxidizing carbon monoxide is located at an upper stream position than any other layers with respect to the flow of the raw air, the procedures of regenerating the desiccant layer 2 for adsorbing water and of the $CO_2$ adsorbent layer 3 for removing carbon dioxide can be carried out without consideration of the presence of the catalyst layer 1. As described above, the state of the catalyst constituting the catalyst layer 1 is not changed by carrying out the purification process, so that the following merits are brought about.

In the case where the catalyst layer 1 is located between the desiccant layer 2 and the $CO_2$ adsorbent layer 3, an extra energy is required in the procedure of regenerating the desiccant layer 2, since the catalyst layer 1 must be heated before the desiccant layer 2 is heated. However, by locating the catalyst layer 1 at the position as described above, no heat loss is caused at the intermediate section since the desiccant layer 2 and the $CO_2$ adsorbent layer 3 are directly connected to each other, and the desiccant layer 2 can be heated efficiently.

Further, even if raw air contains hydrogen as another impurity to be removed, power consumption for the regenerating process is not substantially changed, since only oxidation of hydrogen may be additionally carried out and the amount of catalyst necessary therefor is very limited.

TEST EXAMPLE

Figure 4:
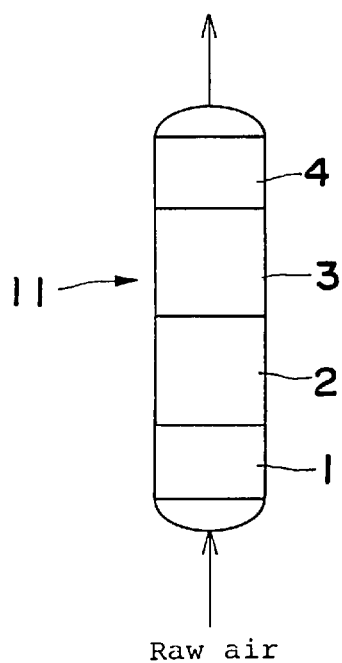
FIG. 4 is a schematic diagram showing a packed column of a gas purifying apparatus employed in Test Example.

Raw air containing impurities to be removed in the amounts as described below was introduced to a packed column 11 of a purifying apparatus shown in FIG. 4 to carry out purification.

Raw air:
  pressure: 600 kPA
  temperature: 10° C.; saturated with moisture
  Impurities: CO 5 ppm, $H_2$ 10 ppm, $CO_2$ 400 ppm Catalyst layer 1: Platinum and iron-on-alumina catalyst (3 g & 1.4 g/100 ml)
Desiccant layer 2: Activated alumina
$CO_2$ adsorbent layer 3: Synthetic zeolite Na-X type Hydrogen removing layer 4: Palladium-on-zeolite catalyst (0.3 g/100 ml)

The raw air was supplied at a fixed flow rate, and dew point, carbon dioxide, hydrogen and carbon monoxide were determined. An optical hygrometer, an infrared gas analyzer and a reduction detector were employed respectively for the determination. The results of determination are shown in FIG. 5.

Figure 5:
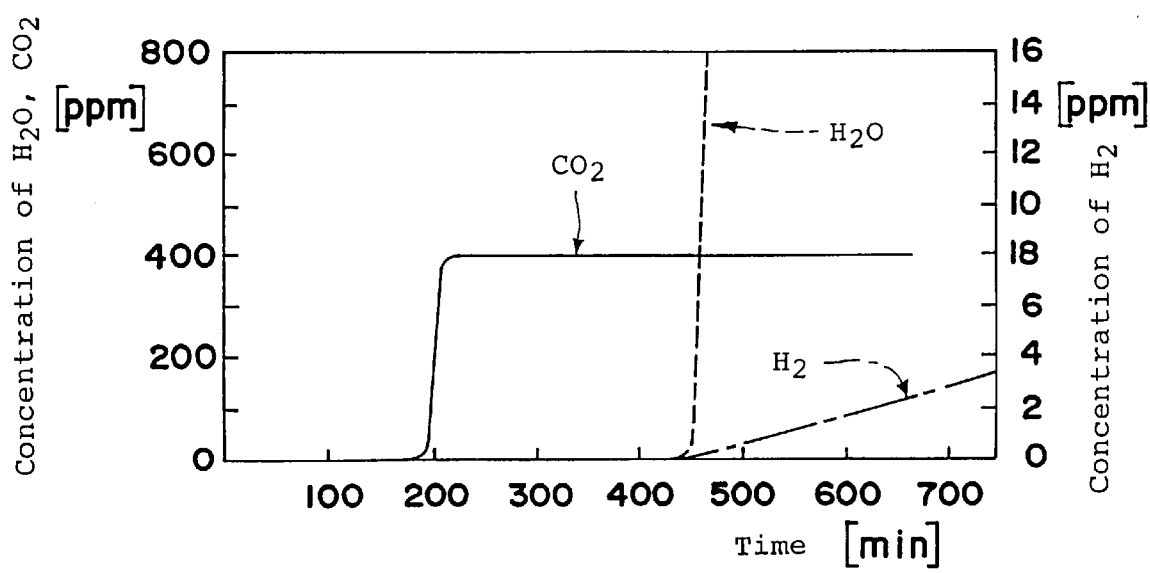
FIG. 5 is a chart showing results of measurement obtained in Test Example in which changes in the concentrations of hydrogen, carbon dioxide and water are plotted respectively.

As shown in FIG. 5, no carbon monoxide was detected over the entire period of determination. The hydrogen concentration increased gradually with breakthrough of water. Breakthrough of carbon dioxide occurred in this apparatus after about 180 minutes.

Based on these results, it was found that the purification process and the regeneration process can be carried out successively and continuously in the system shown in FIGS. 2 and 3 by setting the packing amount of each layer.

We claim:

1. A process for purifying a gas comprising nitrogen and oxygen, which is contaminated with impurities comprising water, carbon monoxide and carbon dioxide, comprising the following steps conducted in the following order:

contacting the gas with a catalyst consisting of platinum or palladium and at least one member selected from the group consisting of iron, cobalt, nickel, manganese, copper, chromium, tin, lead and cerium wherein the catalyst is supported on alumina containing substantially no pores having pore diameters of 110 Angstroms or less under conditions which oxidize the carbon monoxide into carbon dioxide;

contacting the gas with an adsorbent selected from the group consisting of silica gel, activated alumina, zeolite and combinations thereof under conditions in which water is adsorbed and removed from the gas, and contacting the gas with an adsorbent selected from the group consisting of calcium ion exchanged A zeolite; calcium ion exchanged X zeolite; sodium ion exchanged X zeolite and mixtures thereof under conditions which carbon dioxide is adsorbed and removed from the gas.

2. The process of claim 1, wherein the gas is air.

3. The process of claim 1, wherein the gas is further contaminated with hydrogen and the process further comprises the steps of:

contacting the gas with a catalyst comprising from about 0.25 to 1.0 percent by weight of platinum or palladium supported on activated alumina or zeolite under conditions in which the hydrogen is oxidized into water, and adsorbing and the removing the water from the gas by contacting the gas with at least one of the following adsorbents:

(a) silica gel, activated alumina, zeolite and mixtures thereof, which are either mixed the catalyst that oxidizes the hydrogen into water or are present at a location downstream of the catalyst that oxidizes the hydrogen into water, and (b) the activated alumina and/or zeolite that supports the platinum or palladium that promoted the oxidation of the hydrogen into water.

4. The process of claim 4, wherein the steps of oxidizing the hydrogen into water and adsorbing and removing the water from the gas is conducted after the step of adsorbing and removing the carbon dioxide out of the gas.

5. A process for purifying untreated air contaminated with hydrogen, water, carbon monoxide and carbon dioxide using at least two packed columns, each of which contains a catalyst layer; a water adsorbent layer; a carbon dioxide adsorbent layer and a hydrogen removing layer arranged in this order from the inlet of the column to the outlet of the packed column, comprising the steps:

introducing compressed, untreated air into one of the packed columns and successively converting the carbon monoxide into carbon dioxide in the catalyst layer; removing the water in the water adsorbent layer; removing the carbon dioxide in the carbon dioxide adsorbent layer and removing the hydrogen in the hydrogen removing layer;

discharging the purified air from the outlet of the packed column and introducing the purified air into a cryogenic separation system;

introducing a heated return gas from the cryogenic separation system into the outlet of the other packed column for regeneration, wherein the heated return gas effects desorption of the water adsorbed by the hydrogen removing layer; desorption of the carbon dioxide adsorbed by the carbon dioxide adsorbent layer and desorption of the water in the water adsorbent layer;

discharging the water and carbon dioxide containing gas out of the inlet of the column which is being regenerated;

introducing an unheated return gas from the cryogenic separation system through the outlet of the column which is being regenerated and cooling the adsorbent and catalyst layers in the column which is being regenerated, and introducing a portion of the purified air into the cooled regenerated column to repressurize the cooled, regenerated column, wherein the air purification steps and the packed column regeneration steps are alternatively repeated in at least two packed columns in a continuous manner.

6. A process for purifying untreated air contaminated with hydrogen, water, carbon monoxide and carbon dioxide using at least two packed columns, each of which contains a catalyst layer; a water adsorbent layer; a carbon dioxide adsorbent layer and a hydrogen removing layer arranged in this order from the inlet of the column to the outlet of the column, comprising the steps:

introducing compressed, untreated air into one of the packed columns and successively converting the carbon monoxide into carbon dioxide in the catalyst layer; removing the water in the water adsorbent layer; removing the carbon dioxide in the carbon dioxide adsorbent layer and removing the hydrogen in the hydrogen removing layer;

discharging the purified air from the outlet of the packed column;

heating a portion of the purified air to a temperature high enough to effect desorption of carbon dioxide and water from a packed column;

introducing the heated, purified air into the outlet of the other packed column for regeneration, wherein the heated purified air effects desorption of the water adsorbed by the hydrogen removing layer; desorption of the carbon dioxide adsorbed by the carbon dioxide adsorbent layer and desorption of the water in the water adsorbent layer;

discharging the water and carbon dioxide containing air out of the inlet of the column which is being regenerated;

introducing an unheated, purified air through the outlet of the column which is being regenerated and cooling the adsorbent and catalyst layers in the column which is being regenerated, and introducing a portion of the purified air into the cooled regenerated column to repressurize the cooled regenerated column, wherein the air purification steps and the packed column regeneration steps are alternatively repeated in at least two packed columns in a continuous manner.

* * * * *